Patented Dec. 5, 1933

1,937,956

UNITED STATES PATENT OFFICE 1,937,956

PROCESS OF MAKING POTASSIUM ALUMINUM FLUORIDE

Arthur H. Henninger, St. Albans, N. Y., assignor to General Chemical Company, New York, N. Y., a corporation of New York No Drawing. Application June 18, 1931
Serial No. 545,369

7 Claims. (Cl. 23—88)

This invention relates to potassium aluminum fluoride and methods of making the same and particularly to methods of producing potassium aluminum fluoride in a form suitable for use as an insecticide.

It has heretofore been proposed to use potassium aluminum fluoride as an insecticide for the control of various insect pests. This material is considered to possess advantages over lead arsenate as an insecticide for the reason that, although poisonous, the fluoride compound is less toxic to human beings and animals than is lead arsenate.

Potassium aluminum fluoride has heretofore been produced by adding a solution of potassium carbonate to a solution of aluminum sulfate and thereafter adding hydrofluoric acid to the mixed solutions. The reactions which take place in the process heretofore proposed, may be expressed by the following equation:

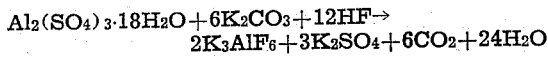
$$Al_2(SO_4)_3 \cdot 18H_2O + 6K_2CO_3 + 12HF \rightarrow$$
$$2K_3AlF_6 + 3K_2SO_4 + 6CO_2 + 24H_2O$$

It will be noted from this equation that the reaction results in the formation of potassium sulfate which largely remains in the mother liquor from which the potassium-aluminum-fluoride is precipitated, thus representing a substantial loss in the process. Furthermore, the precipitate formed must be washed several times to reduce the amount of potassium sulfate in the precipitated product. The loss of potassium in the reactions and the time and expense required to purify the precipitate add to the cost of the product obtained.

I have discovered that the foregoing objections to methods heretofore employed can be overcome and potassium-aluminum-fluoride admirably suited for use as an insecticide can be produced by reacting a solution of aluminum oxide (preferably in the hydrated form) in potassium hydroxide with an acid containing fluorine, the reacting materials being in such proportions that substantially all of the potassium is formed into potassium-aluminum-fluoride. The reaction products consist substantially solely of the complex fluoride and water.

Among the objects of my invention are to provide an improved process for producing potassium-aluminum-fluoride, to obviate the losses in the reacting constituents heretofore involved in the production of said material and to produce potassium-aluminum-fluoride of such quality that it may be used as an insecticide.

These and other objects and features of my invention will appear from the following description thereof.

In practicing my invention I prefer to use hydrated aluminum oxide ($Al_2O_3 \cdot 3H_2O$) as the aluminum bearing compound and digest this material in a solution of potassium hydroxide. The digestion product which contains potassium aluminate and an excess of potassium hydroxide is then treated with an acid containing fluorine such as hydrofluoric acid. The resulting reaction produces a precipitate of potassium-aluminum-fluoride which may be given a single wash with water, dried by evaporation or otherwise and pulverized, if desired. The resulting product is very finely divided rendering it well suited for use as an insecticide.

The following example is illustrative of the foregoing procedure:

4.08 parts by weight of hydrated aluminum oxide (65.35% $Al_2O_3$) are boiled in a solution containing 9.32 parts of potassium hydroxide (79.4% $K_2O$) and 41.5 parts by weight of water. The boiling is continued for 30 minutes, using live steam. 10.1 parts by weight of hydrofluoric acid (analyzing 62.33% available HF) are then gradually added to the heated solution over a period of 25 minutes. The heat of the reaction keeps the liquor boiling and agitating during the addition of the hydrofluoric acid and after all of the acid is added, the mixture is boiled for about 20 minutes longer using live steam. The resulting precipitate is then filtered off, the product obtained is washed once with water, dried and pulverized. On analysis the product is found to contain 98.8% $K_3AlF_6$, the remainder being impurities such as $Al_2O_3$, $Fe_2O_3$ and silica. When given a screen test, 99.55% of the product passes through a 200 mesh screen.

In the foregoing example the proportions of the materials employed are substantially in the ratio of 1 molecular equivalent of hydrated aluminum oxide to about 6 molecular equivalents of potassium hydroxide and 12 molecular equivalents of hydrofluoric acid. The reaction which takes place in carrying out my process as described above may be represented by the equation:

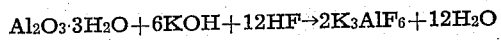
$$Al_2O_3 \cdot 3H_2O + 6KOH + 12HF \rightarrow 2K_3AlF_6 + 12H_2O$$

It will be noted from this equation that the materials employed in the example cited contain only the elements potassium, aluminum and fluorine in combination with hydrogen and oxygen and the only products of the reaction are the potassium aluminum fluoride and water. Thus none of the potassium or other valuable constituents are lost in the process and the resulting product is not contaminated by impurities resulting from side reactions.

I have used hydrofluoric acid containing a substantial amount of hydrofluosilicic acid in carrying out my process. It will also be apparent that I may if desired, dissolve potassium aluminate in water and react the solution of the potassium aluminate directly with potassium hydroxide and hydrofluoric acid. While I have referred to hydrated aluminum oxide as the aluminum bearing material employed, I may use bauxite for example as a source of hydrated aluminum oxide if desired. These and other modifications of my invention will be apparent to those skilled in the art, and may be employed without departing from my invention. It will also be understood that my invention is not limited to the use of the specific concentrations of the materials cited in the foregoing example since other suitable concentrations of the reacting materials may be employed, the process as described in the example being merely illustrative of the preferred form thereof.

I claim:

1. A process for producing $K_3AlF_6$, which comprises the steps of dissolving aluminum oxide in a solution of potassium hydroxide and adding hydrofluoric acid to the solution produced.

2. A process for producing potassium-aluminum-fluoride comprising the steps of boiling aluminum oxide in a solution of potassium hydroxide and thereafter adding hydrofluoric acid.

3. A process for producing $K_3AlF_6$ comprising the step of digesting a solution of potassium hydroxide containing aluminum oxide with hydrofluoric acid.

4. A process for producing potassium-aluminum-fluoride which comprises dissolving aluminum oxide in a solution of potassium hydroxide, heating the solution produced, and gradually adding hydrofluoric acid to said solution while said solution is heated.

5. A process of producing dry powdered potassium-aluminum-fluoride in a form suitable for use as an insecticide which comprises boiling aluminum oxide in a solution of potassium hydroxide, and thereafter adding hydrofluoric acid to the resulting solution, separating the precipitate of potassium-aluminum-fluoride produced, washing the precipitate with water and then drying and pulverizing the precipitate.

6. A process of producing dry powdered $K_3AlF$ in a form suitable for use as an insecticide which comprises digesting a solution of potassium hydroxide containing 1 molecular equivalent of aluminum oxide to 6 molecular equivalents of potassium hydroxide with 12 molecular equivalents of hydrofluoric acid, evaporating the water contained in the resulting product and pulverizing the product.

7. A process of producing dry powdered potassium-aluminum-fluoride in a form suitable for use as an insecticide which comprises boiling approximately 1 molecular equivalent of aluminum oxide with about 6 molecular equivalents of potassium hydroxide in water until a substantial portion of the aluminum oxide is dissolved, gradually adding approximately 12 molecular equivalents of hydrofluoric acid to the solution produced, while said solution is heated, separating the precipitate of potassium aluminum fluoride produced, washing the precipitate with water and then drying and pulverizing the precipitate.

ARTHUR H. HENNINGER.

Certificate of Correction

Patent No. 1,937,956. December 5, 1933.

ARTHUR H. HENNINGER

It is hereby certified that errors appear in the printed specification of the above numbered patent requiring corrections as follows: Page 1, line 90, for "98.8%" read *98.28%*; page 2, line 91, claim 6, for "$K_3A1F$" read $K_3A1F_6$; and that the said Letters Patent should be read with these corrections therein that the same may conform to the record of the case in the Patent Office.

Signed and sealed this 16th day of January, A. D. 1934.

[SEAL]

F. M. HOPKINS,
*Acting Commissioner of Patents.*